(12) United States Patent
Cai et al.

(10) Patent No.: US 8,871,317 B2
(45) Date of Patent: Oct. 28, 2014

(54) CURABLE ADHESIVE SYSTEM, METHOD OF ASSEMBLY OF DISTINCT COMPONENTS THEREWITH

(75) Inventors: Kevin G. Cai, Cumberland, RI (US); Darnell C. Worley, II, Uxbridge, MA (US)

(73) Assignee: Teknor Apex Company, Pawtucket, RI (US)

(\*) Notice: Subject to any disclaimer, the term of this patent is extended or adjusted under 35 U.S.C. 154(b) by 477 days.

(21) Appl. No.: 12/807,604

(22) Filed: Sep. 9, 2010

(65) Prior Publication Data
US 2012/0064274 A1 Mar. 15, 2012

(51) Int. Cl.
| | |
|---|---|
| B32B 9/04 | (2006.01) |
| C08F 2/46 | (2006.01) |
| C08F 283/12 | (2006.01) |
| C08G 77/04 | (2006.01) |
| C08G 77/06 | (2006.01) |
| B32B 1/00 | (2006.01) |
| C09J 133/02 | (2006.01) |
| F16L 47/02 | (2006.01) |
| C09J 5/02 | (2006.01) |
| C09J 11/06 | (2006.01) |
| B29C 65/14 | (2006.01) |
| B29C 65/48 | (2006.01) |
| B29C 65/52 | (2006.01) |
| B29C 65/56 | (2006.01) |
| B29C 65/00 | (2006.01) |
| C08K 5/54 | (2006.01) |

(52) U.S. Cl.
CPC ............... *C09J 133/02* (2013.01); *F16L 47/02* (2013.01); *C09J 5/02* (2013.01); *C09J 11/06* (2013.01); *B29C 65/1406* (2013.01); *B29C 65/1409* (2013.01); *B29C 65/4845* (2013.01); *B29C 65/52* (2013.01); *B29C 65/561* (2013.01); *B29C 66/5221* (2013.01); *B29C 66/71* (2013.01); *B29C 66/712* (2013.01); *C08L 2312/06* (2013.01); *C08K 5/54* (2013.01); *C09J 2400/226* (2013.01); *C09J 2400/228* (2013.01); *C09J 2433/00* (2013.01)
USPC .......... 428/34.1; 428/35.7; 428/447; 428/448; 522/99; 522/148; 528/20; 528/21; 528/25; 528/26

(58) Field of Classification Search
CPC ......... C08L 83/00; C08L 83/04; C08L 83/14; B32B 27/08; B32B 27/28
USPC ........... 428/34.1, 35.7, 36.9, 36.91, 447, 448; 106/287.13–287.16; 522/99, 148; 528/20, 21, 25, 26, 30
See application file for complete search history.

(56) References Cited

U.S. PATENT DOCUMENTS 3,865,776 A 2/1975 Gergen
4,129,667 A \* 12/1978 Lorenz et al. ............... 427/507

(Continued)

FOREIGN PATENT DOCUMENTS

WO WO2009/077389 6/2009
WO 2010024428 A1 3/2010

*Primary Examiner* — Walter B Aughenbaugh
(74) *Attorney, Agent, or Firm* — Hudak, Shunk & Farine Co. LPA (57) ABSTRACT

An adhesive system including a synergistic combination of a light curable silicone-containing adhesive composition and an amine-containing primer composition that provides desirable bond strength between two articles preferably one of the articles including a polyolefin or polyolefin-based thermoplastic elastomer. Methods of connecting articles, preferably those utilized in fluid transfer applications, utilizing the adhesive system and the resulting adhered assemblies are disclosed.

15 Claims, 1 Drawing Sheet

(56) References Cited

U.S. PATENT DOCUMENTS

| | | | |
|---|---|---|---|
| 4,528,081 A | 7/1985 | Lien et al. | |
| 4,669,802 A | 6/1987 | Schaffer | |
| 4,725,630 A * | 2/1988 | Magee et al. | 522/99 |
| 5,063,254 A * | 11/1991 | Nakos | 522/43 |
| 5,348,986 A | 9/1994 | Chu et al. | |
| 5,498,642 A | 3/1996 | Chu et al. | |
| 5,516,812 A | 5/1996 | Chu et al. | |
| 5,663,269 A | 9/1997 | Chu et al. | |
| 6,140,444 A | 10/2000 | Levandoski et al. | |
| 6,451,870 B1 | 9/2002 | DeCato et al. | |
| 6,583,250 B2 | 6/2003 | Birnbrich et al. | |
| 6,590,033 B2 | 7/2003 | Ding et al. | |
| 6,627,672 B1 | 9/2003 | Lin et al. | |
| 6,733,893 B2 * | 5/2004 | Suzuki et al. | 428/447 |
| 6,773,447 B2 * | 8/2004 | Laguna | 606/198 |
| 6,828,355 B1 | 12/2004 | Chu | |
| 6,846,535 B2 | 1/2005 | De Groot et al. | |
| 7,309,732 B1 | 12/2007 | Issari | |
| 2002/0183413 A1 | 12/2002 | Williams et al. | |
| 2009/0143554 A1 | 6/2009 | Issari et al. | |
| 2009/0166559 A1 | 7/2009 | Levandoski et al. | |
| 2010/0098586 A1 | 4/2010 | Lopez et al. | |
| 2010/0184880 A1 | 7/2010 | Fukui | |

* cited by examiner

CURABLE ADHESIVE SYSTEM, METHOD OF ASSEMBLY OF DISTINCT COMPONENTS THEREWITH

FIELD OF THE INVENTION

The present invention relates to an adhesive system including a synergistic combination of a light curable silicone-containing adhesive composition and an amine-containing primer composition that provides desirable bond strength between two articles, preferably one of the articles including a polyolefin or polyolefin-based thermoplastic elastomer. Methods of connecting articles, preferably those utilized in fluid transfer applications, utilizing the adhesive system and the resulting adhered assemblies are disclosed.

BACKGROUND OF THE INVENTION

Many different materials have been utilized in the medical and fluid transfer fields in applications, for example tubing, containers, IV bags, blood bags, medical connectors, mask covers, asthma bags, syringes, medical drapery, catheters and various scopes. Polyvinyl chloride (PVC) has been used in such applications but organizations are looking for alternatives to PVC. Other materials utilized include polyolefins, polyesters, polyurethanes, acrylonitrile butadiene styrene (ABS), polycarbonates, and acrylics. Due to the differences in materials utilized to form the various components, it can be difficult to obtain good adhesion between the same using various available adhesives. For example, bonding polyolefins or other non-polar polymers to themselves or other materials with traditional adhesive is difficult due to low polarity or surface energy. Examples of various polymeric materials are found in U.S. Pat. Nos. 6,846,535, 6,590,033, 6,583,250, 3,865,776 and U.S. Publication 2010/0098586 herein fully incorporated by reference.

Various adhesives have been developed to bond polymeric materials, some intended for use as medical materials.

U.S. Pat. No. 7,309,732 to Issari relates to silicone formulations which are reportedly capable of being rapidly cured to tough elastomeric materials through exposure to UV radiation, and optionally through exposure to moisture as well. The cured products reportedly demonstrate high resistance to flammability and combustibility.

U.S. Pat. No. 6,828,355 to Chu relates to resin-reinforced silicone compositions curable upon exposure to radiation in the electromagnetic spectrum, which compositions when cured reportedly demonstrate improved elastomeric properties, such as tensile strength, modulus and elongation. The resin-reinforced silicone compositions may alternatively be rendered curable by exposure to moisture. In addition, the composition may be rendered curable by exposure to radiation in the electromagnetic spectrum, and exposure to moisture. The silicone compositions are particularly well suited for use in electronic conformal coating and potting applications, as well as in automotive gasketing applications, pressure sensitive adhesive applications and the like.

U.S. Publication 2009/0166559 to Levandoski et al. relates to curable silicone compositions which include a fluorescent agent for detection purposes and which have a cure system which reportedly enables the silicone compositions to possess improved depth of cure. The silicone compositions are photocurable, and may also be moisture or heat curable.

U.S. Publication 2009/0143554 to Issari et al. relates to polysiloxane compositions grafted with heat curable, moisture curable, or heat/moisture curable groups. In particular, the polysiloxane compositions have reactive groups on the terminal or pendent areas of the siloxane backbone, which once reacted provide heat and/or moisture curable polysiloxanes.

WO2009/077389 to Henkel AG & Co. KGAA relates to curable compositions containing at least one organopolysiloxane, which contains at least one hydroxyl group and/or group which can be hydrolyzed, in aqueous dispersion, i) at least one organopolysiloxane having a dynamic viscosity of 0.05 to 7, which is free of hydroxyl groups and/or groups which can be hydrolyzed, in aqueous dispersion, at least one cross-linking agent, at least one emulsifier, at least one cross-linking catalyst, at least one aqueous silicon-free polymer dispersion, at least one filler, and optionally water. The compositions are reportedly suitable as sealants, adhesives, or coating agents for application in the construction field, in particular in the sanitary field and in the kitchen field.

For medical or fluid transfer devices with tubing connected through connectors, especially female connectors made with various engineering plastics, the use of silicone-based adhesive in some cases does not have high enough bonding strength between a low polarity polymer, for example polyolefin or polyolefin-based thermoplastic elastomer (TPE) tubing and connectors. In view of the above, it would be desirable to provide an adhesive system including a light curable silicone-based adhesive that provides excellent adhesion between polyolefin and other non-polar polymer based TPE and many different materials, especially dissimilar materials, for example other polymers, ceramic, glass, metal, etc., and having excellent retention force and a clean appearance.

SUMMARY OF THE INVENTION

Accordingly, it is an object of the present invention to provide an adhesive system for bonding two or more articles, for example with one article comprising a polyolefin, a polyolefin-based thermoplastic elastomer or other non-polar polymer-based TPE with various materials and comprising a silicone-containing adhesive and an amine-containing primer.

An additional object of the present invention is to provide an adhesive system comprising a silicone-containing adhesive additionally including an acrylate monomer and a photoinitiator that when cured utilizing light, for example, ultraviolet (UV) or high-power visible light, achieves good bond strength between the two articles.

Yet another object of the present invention is to provide a silicone-containing adhesive composition additionally including an acrylate monomer and acrylamide-containing monomer.

Still another object of the present invention is to provide an adhesive system including an adhesive composition and a primer that, when the adhesive composition is light cured, has desirable retention force and a desired appearance.

A further object of the present invention is to provide a method for joining two articles, preferably dissimilar polymers, including the steps of applying an amine-containing primer to one or more of a first and second polymer, generally polymer articles, applying an adhesive composition to one or more of the polymers or polymer articles, contacting the first polymer and second polymer, and subsequently curing the adhesive composition thereby connecting the first polymer and the second polymer.

Yet another object of the present invention is to provide a method for joining medical tubing with a medical connector utilizing an adhesive system including an amine-containing primer and a silicone-containing adhesive composition that is light curable.

Still another object of the present invention is to provide a method for joining medical tubing with a medical connector utilizing a light curable silicone-containing adhesive composition and further priming one or more of the medical tubing and medical connector with an amine-containing primer prior to bonding.

Yet another object of the present invention is to provide an assembly of two different polymers adhered by an adhesive system comprising the silicone-containing adhesive composition and an amine-containing primer that forms a desirable bond between the first and second polymers.

Still another object of the invention is to provide an assembly wherein the first polymer is a fluid transfer tube (i.e. for transferring any liquid and/or vapor) and the second polymer is a tube connector.

In one aspect of the present invention a light curable adhesive system for connecting two or more articles is disclosed comprising a light curable adhesive composition comprising a silicone-containing compound and a photoinitiator, and a primer composition comprising an amine-containing compound in a carrier liquid.

Another aspect of the present invention is to provide a method for bonding two articles, comprising the steps of applying a primer composition comprising an amine-containing compound in a carrier liquid to a portion of a first article comprising a first polymer, applying an adhesive composition comprising a silicone-containing compound and a photoinitiator to a portion of the first article comprising the first polymer, contacting the adhesive composition coated portion of the first article with a second article, and curing the adhesive composition to bond the first article to the second article.

A further aspect of the present invention is to provide an adhesive bonded assembly, comprising a first article comprising a first polymer bonded by an adhesive system to a second article, the adhesive system derived from a silicone-containing adhesive, and a primer comprising an amine-containing compound in a carrier liquid.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

The adhesive system of the invention is utilized to bond two articles, preferably of different composition. One article is preferably a low polarity or non-polar polymer that is relatively difficult to bond with a traditional adhesive due to relatively low polarity, for example a polyolefin or polyolefin-based thermoplastic elastomer or polyolefin-based thermoplastic vulcanizate. In one embodiment, the articles are components or devices, such as but not limited to, tubing preferably fluid transfer tubing such as medical tubing or dairy tubing, tubing connectors, containers, tape, fluid bags such as IV and blood bags, asthma bags, Y-sites, injection sites, housings, spikes, syringe bands, medical drapery, catheters, mask covers, closures, and drip chambers.

Figure 1:
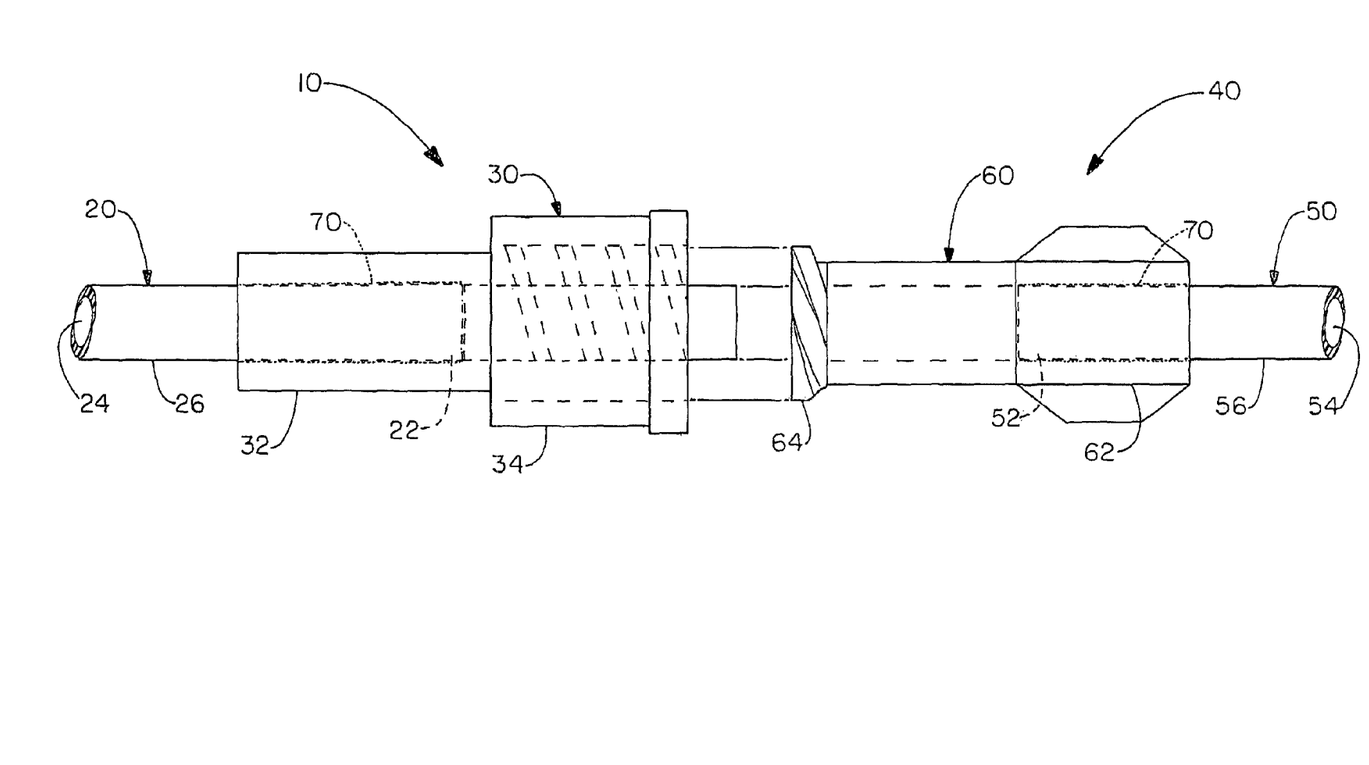
FIG. 1 is an elevational view of one of two different assemblies of the present invention each consisting of a tube and a connector that can be interconnected, wherein tubes are adhered to connectors by an adhesive system of the present invention.

As a non-limiting example, FIG. 1 illustrates one embodiment of a pair of assemblies 10, 40 including a first assembly 10 comprising a first article 20, namely a tube bonded to a second article 30, namely a connector by an adhesive system 70 and a second assembly 40 comprising a first article 50, also a tube, bonded to a second article 60, namely another connector by adhesive system 70. The tube that forms first article 20 includes a substantially cylindrical outer diameter or surface 26 and an inner diameter 24 through which a fluid is adapted to flow. The article 20 has a first end 22 that serves as a male connection that has been inserted into female connector 32 of the second article 30 and adhered by the adhesive system 70. Second article 30 includes an additional female connector 34 connected at an end opposite female connector 32 for connection to a mateable male portion of assembly 40. The first article 20 has a first portion that is bonded to a second portion of the second article 30. The second assembly 40 is a first article 50, namely a tube having a first end 52 connected within the female connector 62 of the second article 60. Article 50 also has an outer diameter 56 and an inner diameter 54 through which fluid is adapted to flow. The male end 64 of article 60 is adapted to be threadable within the female connector 34 of article 30. As illustrated in FIG. 1, preferably the outer diameter of the tube is adhered to the inner diameter of the connector, i.e. the tube is connected to a female connector. In some other embodiments, the inner diameter of the tube is adhered to the outer diameter of the connector.

The adhesive system includes a synergistic combination of a light curable silicone-containing adhesive composition and a primer composition that, in one embodiment, is applied to an area to be bonded of one or more of the articles and allowed to subsequently dry prior to the adhesive composition being applied thereover, with the adhesive composition further coming into contact with the articles to be bonded and light cured to form a strong bond therebetween. The adhesive composition and primer composition can be blended as discussed further hereinbelow.

The primer composition comprises an amine-containing compound, preferably dissolved or suspended in a carrier liquid. Surprisingly, the amine-containing primer has been found to provide beneficial results when used in conjunction with the silicone-containing adhesive composition. The primer has been discovered to greatly enhance the adhesion between polyolefin and other substrates. It is believed that the primer enhances the interaction between the adhesive and polyolefin surface. The amine primer is also believed to drive the adhesive to cure completely. That is, greater bond strength can be achieved with the use of primer than without the primer. It is believed that the primer interacts with the polymer surface or surfaces it is applied to and renders the same more receptive to the adhesive.

The amine-containing compounds can be a primary amine, secondary amine, or a tertiary amine, or a combination thereof. Tertiary amines are preferred. While not wishing to be bound by theory, it is believed the aliphatic tail links the low polarity surface with the adhesive better and therefore leads to better adhesion. The amine can be aliphatic, aromatic, or alkylaromatic, each optionally substituted with one or more functional groups. Aliphatic amines are preferred in one embodiment.

In one embodiment, the aliphatic amine has the general formula: $R-NH_2$, wherein R is an aliphatic group having one, two or more carbon atoms, desirably at least 6 carbon atoms and preferably from about 6 to about 20 carbon atoms, wherein the R group may be branched or straight chained.

The secondary amines which can advantageously be used in the invention are selected from those defined by the following general formula:

wherein each R represents an alkyl radical of from 1 to about 8 or about 20 carbon atoms, e.g. methyl, ethyl, propyl, isopropyl, butyl, 2-ethylhexyl, etc., an aryl radical containing from 6 to about 8 carbon atoms, e.g. phenyl, tolyl, xylyl, etc. groups, an aralkyl radical containing from 7 to about 8 carbon atoms, e.g. benzyl or phenylethyl or a cycloalkyl radical containing from 5 to about 6 carbon atoms, e.g. cyclopentyl or cyclohexyl. Typical amines coming within the above formula include, but are not limited to, dimethylamine, diethylamine, dipropylamine, diisoproplyamine, dibutylamine, methylethylamine, propylbutylamine, diphenylamine, methylaniline, butylaniline, dibenzylamine, ethylbenzylamine, butylbenzylamine, dicyclohexylamine, etc.

Suitable tertiary amines are defined by the following general formula:

wherein each R is as above defined. Typical tertiary amines include, but are not limited to, trimethylamine, triethylamine, tripropylamine, triisopropylamine, tributylamine, methyldiethylamine, methyldipropylamine, dimethylethylamine, methylethylpropylamine, methylethylaniline, methylisopropylaniline dipropylaniline, methyldiphenylamine, ethyldiphenylamine, triphenylamine, diethylbenzylamine, dipropylbenzylamine, etc.

Examples of substituted amines are N-substituted alkanolamines defined by the following general formula:

wherein each R is as above defined and $R_1$ represents a hydrogen atom, an alkyl radical containing from 1 to about 4 carbon atoms, an aryl radical containing from 6-8 carbon atoms, an aralkyl radical containing from 7 to about 8 carbon atoms or a cycloalkyl radical containing from 5 to about 6 carbon atoms. Typical N-substituted alkanolamines include ethanolamine, methylethylethanolamine, diphenylethanolamine, phenylethylethanolamine and the corresponding ethanolamines wherein $R_1$ is alkyl, aryl, aralkyl or cycloalkyl as defined above, e.g. N-benzyl-N-ethyl-N-(2-phenylethanol) amine.

Additional substituted amines include acrylated N-substituted alkanolamines defined by the following general formula:

wherein each R and $R_1$ are as above defined and $R_2$ represents an alkyl or alkenyl radical containing from 1-8 carbon atoms, e.g. methyl, ethyl, propyl, isopropyl, butyl, pentyl, 2-ethylhexyl, vinyl, propenyl, isopropenyl, butenyl, etc. Typical acylated N-substituted alkanolamines include the acetic propionic, butyric, valeric, acrylic, methacrylic, benzoic, etc. acid esters of dialkylethanolamine e.g. β-dimethylaminoethyl acetate, β-diethylaminoethyl acetate, β-dimethylaminoethyl methacrylate, β-diethylaminoethyl acrylate, β-dimethylaminoethyl benzoate, β-diethylaminoethyl benzoate, β-dimethylaminoisopyl benzoate, etc.

Diamines such as those defined by the following general formula can also be used:

wherein R is as above defined and $R_3$ represents a hydrogen atom or an alkyl radical containing from 1 to about 4 carbon atoms. Typical diamines include N,N'-dimethyl-ethylenediamine, N,N'-diethyl-ethylenediamine, N,N-dibutylethylenediamine, N,N'-dicyclohexyl-ethylenediamine, N,N,N'N'-tetraethyle-ethylenediamine, N,N-dimethyl-N',N'-diethylethylene diamine, N'-benzyl-N,N-diethyl-ethylenediamine, N,N'-diphenyl-ethylenediamine, N,N-diethyl-N',N'-diphenyl-ethylenediamine, etc.

Heterocyclic amines can also be used, such as defined by the following general formula:

wherein R is above defined, e.g. 1-methyl-4-(2-hydroxypropyl)piperazine, 1,4-bis(2-hydroxyethyl)piperazine, etc., or compounds defined by the following general formula:

wherein $R_1$ is as above defined and $R_4$ represents the atoms necessary to complete a 5- or 6-membered heterocyclic nucleus e.g. N-(2-hydroxyethyl)morpholine, N-(2-hydroxypropyl)morpholine, N-(2-hydroxyethyl)piperidine, 2-(2-hydroxypropyl)piperidine, 2-(2-hydroxyethyl)pyrrolidine, etc. Other useful amines are poly-N-vinyl pyridine and poly (ethyleneimine).

Suitable amine containing primers are available from sources such as Loctite, and Permabond.

The carrier of the primer composition is preferably a low boiling point liquid that is able to evaporate at normal use temperatures, i.e. around room temperature (about 22° C.) within a reasonable time, generally less than about one minute. Examples of suitable carriers include, but are not limited to various hydrocarbon, preferably relatively low boiling point hydrocarbon, and organic solvents, for example naphtha, hydrotreated light naphtha, hexane, heptane, methanol, isopropanol, and ethanol. Mixtures of two or more carriers can be utilized. The solvent should not react with the amine under the conditions of use.

The amine-containing compound is preferably utilized in the carrier at a concentration of from about 0.01 part to about 2 parts by weight based on 100 total parts by weight of the primer composition. Preferably the amine-based compound is present in an amount from about 0.05 part to about 0.2, 0.5 or 1 part by weight per 100 parts of the primer composition.

The primer composition comprising the amine-containing compound in the liquid medium may be applied to the substrate or article surface to be bonded with the silicone-containing adhesive in any manner that is satisfactory to effect enhanced adhesion of the adhesive to the substrate, as for example, by spraying, dipping, brushing, swabbing, wiping, coating, or the like is known to those of ordinary skill in the art. One or both surfaces of the first article and the second article may be primed. It is preferred to at least apply the primer composition to the surface that is more difficult to bond, i.e. low polarity surface.

After the primer composition is applied to the substrate article surface or surfaces to be adhesively bonded, the silicone-containing adhesive composition is applied to the desired article surface, preferably the one or more primer treated portions of the surfaces. Substrates are then contacted or brought together and the adhesive light cured to form the bonded assembly.

The thickness of the primer may vary widely depending upon the character and composition of the article surfaces to be bonded, as well as the nature of the end use of the bonded assembly, and the gap between the tubing and the connector. Typically one application of the primer composition is sufficient, but multiple coatings or layers may be applied.

The silicone-containing adhesive composition includes at least one silicone-containing compound. Various silicone-containing compositions are known in the art and for example described in U.S. Pat. Nos. 4,528,081; 4,669,802; 5,348,986, 5,498,642, 5,516,812, 5,663,269; 6,140,444; 6,451,870; 6,828,355; and 7,309,732; U.S. Publications 2009/0143554 and 2009/0166559 A1; and WO 2009/077389, all herein fully incorporated by reference.

The adhesive composition of the present invention is at least curable utilizing light. Optionally, one or more of heat and moisture may be additionally used in order to accelerate or initiate cure of the adhesive. Desirably the adhesive is photocurable under both visible light and ultra-violet (UV) light conditions.

A silicone-containing component may include silicone polymers described above in the patents incorporated by reference, such as those within the general formula:

where A represents a polymer or copolymer backbone, which can be any number of combinations of polyurethane, silicone, polyamide, polyether, polyester, and the like; $R^1$ and $R^2$ may be the same or different and are monovalent hydrocarbyl groups having up to 10 carbon atoms, or halo- or cyano-substituted hydrocarbyl groups: $R^3$ and $R^4$ may be the same or different monovalent groups and may contain an ethylenically unsaturated polymerizable double bond; $R^5$ is a methyl, ethyl, isopropyl or —$CH_2CH_2OCH_3$; a is 0, 1, or 2; a+b is 1 or 2; and $R^6$ is a monovalent hydrocarbyl group or Any suitable photoinitiator known to those skilled in the art can be utilized including liquid or solid photoinitiators, and combinations thereof. Suitable photoinitiators include, but are not limited to acylphosphine oxides or bisacylphosphine oxides, (substituted) benzophenones, (substituted) acetophenones, benzoin and its alkyl esters, (substituted) xanthones, camphoroquinone peroxyester initiators, 9-fluorene carboxylic acid peroxyester initiators, alkyl thioxanthones such as isopropyl, Michler's ketone and combinations thereof.

A solvent component can be utilized if desired, especially with the presence of a solid photoinitiator that serves to promote compatibility between the same and the silicone-containing composition. A solvent may be selected from a wide variety of solvents and may be unreactive or reactive with the curable silicone-containing component. The solvent can be a nonpolar solvent such as a silane, or solvents described in U.S. Pat. No. 6,627,672 herein fully incorporated by reference.

The adhesives may additionally include flame retardant components in desired amounts effective to enhance resistance of the composition to flammability and combustion. Examples of suitable flame retardants include precipitated silicas, hydrated zinc borates and hydrated aluminas, and combinations thereof.

A further component which may optionally be included in the inventive compositions is a reactive diluent, such as (meth)acrylates, for instance those represented by $H_2C$=$CGCO_2R$ where G may be hydrogen, halogen or alkyl of 1 to about 4 carbon atoms, and R may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulonate, sulfone and the like. Alternative diluents include, without limitation, vinyl trimethoxysilane; alkyl acetates; hydrocarbon solvents, such as toluene; and acrylamides, such as N,N-dimethyl acrylamide. The one or more (meth)acrylates monomers or reactive dulents are present in an amount from about 20 to about 70 and preferably from about 30 to about 60 parts by weight per 100 parts by weight of the adhesive composition.

Other useful additives include plasticizers, fillers such as silica, viscosity modifiers, flow modifiers, pigments, antioxidants, stabilizers, inhibitors, adjuvants, catalysts, accelerators, thixotropic agents, and combinations thereof. These additives are optionally present in amounts suitable to effectuate their intended purpose.

The adhesive compositions of the invention may also include other ingredients to modify the cured or uncured properties as desired for specific applications. For instance, adhesion promoters, such as (meth)acryloxypropyltrimethoxysilane, trialkyl- or triallyl-isocyanurate, glycidoxypropyl trimethoxysilane, vinyl trimethoxysilane and the like, may be incorporated.

Plasticizers may be present. An example of a plasticizer is a non-(meth)acrylated silicone, such as trimethylsilyl-terminated oils of 100-500 cP viscosity and silicone gums. The non-(meth)acrylated silicones may include co-curable groups, such as vinyl groups.

The adhesive composition can be light cured utilizing a variety of equipment. Lamps such as Mercury Arc Lamps, Metal Halide Lamps, bulbs such as "D", "H", or "V" from Fusion UV Systems, Inc. that emit relatively high intensity light in the UVA and UVB, UVC and visible light regions are useful. Examples of useful UV light wavelengths may range from 200 nm to 380 nm, whereas, examples of useful visible light wavelengths may range from 380 nm to 500 nm. Typical light-cure properties may be generated, for example, at an intensity of 70 mW/cm$^2$ for a duration of about 60 seconds, as measured either at 365 nm for UV light or 405 nm for visible light sources. The selection of the cure conditions may vary. The time and intensity, as well as the selected wavelength may vary with the selected composition, depth and type of application. Generally intensities of about 20 to 180 mW/cm$^2$ are practical, as are cure-time durations from 5 seconds to minutes.

Suitable light curable silicone-containing compositions are available from commercial sources such as from Loctite as 5055, 5056 and 5240.

In one embodiment of the invention, the adhesive system comprises a mixture or blend containing the adhesive composition comprising the silicone-containing compound and the amine-containing compound in a carrier liquid. In this particular embodiment, only a single application of the adhesive system to one or more articles is required. Preferably the carrier liquid is allowed to evaporate somewhat prior to light curing of the adhesive composition.

The polymer articles of the invention can be formed from any of a number of polymers. In one embodiment at least one article comprises a low polarity polymer, for example a polyolefin, a thermoplastic elastomer, or thermoplastic vulcanizate, Polymeric articles utilized in medical, dairy, or other fluid transfer applications are typically formed from materials such as, but not limited to, polyolefins, polycarbonate resins, acrylic resins, acrylonitrile-butadiene-styrene resins, polyesters, olefin-containing alloys, EPDM rubber, polyacetals, polyamides such as nylon, fluorocarbon polymers such as polytetrafluoroethylene and various thermoplastic elastomers, such as styrenic block polymers and polyolefin-based TPE. The polyolefins, of course, include, for example, polypropylene, polyethylene, and polybutylene, and various grades thereof. Examples of suitable styrenic block polymer containing compositions are set forth in U.S. Pat. No. 6,846,535, herein fully incorporated by reference Of course, mixtures of the above polymers, where appropriate, can also be utilized.

The adhesive composition comprising the silicone-containing composition may be applied to the article's surface itself or a surface that has been primed with a primer composition. After the primer solution is applied and preferably allowed to dry, the silicone-containing adhesive composition is placed thereon, such as by spraying, dipping, brushing, swabbing, wiping, coating, or the like. The substrates are then brought together and contacted at the desired locations in order to effect adhesive bonding of the substrate article elements and to form the bonded assembly. The thickness of the adhesive layer ranges generally from about 0.254 to about 508 micrometers (0.01 mil to 20 mil), desirably, about 1.27 to about 127 micrometers (0.05 mil to 5 mil), and preferably from about 5.08 to about 50.8 micrometers (0.2 mil to 2 mil). Any excess amount of adhesive outside of the bonding surface should be removed to ensure a clean bonded assembly is formed that is translucent or clear.

EXAMPLES

In order to illustrate the benefits of the adhesive system of the present invention, various adhesive systems were prepared and utilized to bond a first article, namely a tube, to a second article, a connector sometimes referred to in the medical field as a Luer lock connector. The tubing utilized had a 0.16 inch outer diameter and 0.10 inch inner diameter. The tubing was formed from a low-polarity polymer composition, namely thermoplastic elastomer comprising a styrenic block copolymer and a polyolefin. The Shore A hardness of the thermoplastic elastomer is set forth in Table 1. Connectors of the indicated composition were purchased from Qosina of Edgewood, N.Y. The inner diameter of the portion of the connector connected to the tube outer diameter was about 0.16 inch. The primer composition comprised about 0.1 percent aliphatic amine in a hydrocarbon solvent as a carrier. The adhesive composition contained about 30 to about 60 weight percent of a silicone containing component, 30 to 60 weight percent of an acrylate monomer, 1 to 5 weight percent of an acrylamide and 1 to 5 weight percent of a photoinitiator. The primer solution was applied through spraying, brushing or dipping to the end of the tubing to be bonded. After most of the carrier in the primer composition was evaporated, the light curable silicone adhesive composition was applied through a dispenser or brushing. The tubing was pushed into the female connector. If needed, the tubing was pulled out and pushed back in to allow proper wetting of the connector with the adhesive. The assembled tubing/connector was then exposed to UV light or LED visible light to cure the adhesive. The retention force of the assembled tubing/connector was measured on an Instron tensile instrument at 20 in/min speed. The results of the average retention force of the adhered assemblies are set forth in Table 1 below.

TABLE 1

| Examples | Primer | Tubing TPE Material Hardness[1] | Connector | Average Retention Force (lbf) |
|---|---|---|---|---|
| Comparative #1 | No | 75A | Acrylic | 7.4 |
| Comparative #2 | No | 80A | Acrylic | 8.7 |
| Comparative #3 | No | 85A | Acrylic | 9.2 |
| Comparative #4 | No | 75A | ABS | 7.0 |
| Comparative #5 | No | 80A | ABS | 8.1 |
| Comparative #6 | No | 85A | ABS | 8.0 |
| 1 | Yes | 75A | Acrylic | 9.1 |
| 2 | Yes | 80A | Acrylic | 10.6 |
| 3 | Yes | 85A | Acrylic | 12.7 |
| 4 | Yes | 75A | ABS | 8.9 |
| 5 | Yes | 80A | ABS | 10.9 |
| 6 | Yes | 85A | ABS | 12.6 |
| Comparative #7 | No | 86A | Acrylic | 9.2 |
| Comparative #8 | No | 73A | Acrylic | 7.4 |
| Comparative #9 | No | 78A | Acrylic | 8.7 |
| Comparative #10 | No | 86A | ABS | 8.0 |
| Comparative #11 | No | 73A | ABS | 7.0 |
| Comparative #12 | No | 78A | ABS | 8.1 |
| 7 | Yes | 86A | Acrylic | 12.7 |
| 8 | Yes | 73A | Acrylic | 9.1 |
| 9 | Yes | 78A | Acrylic | 10.6 |
| 10 | Yes | 86A | ABS | 12.6 |
| 11 | Yes | 73A | ABS | 8.9 |
| 12 | Yes | 78A | ABS | 10.9 |

[1]ASTM D-2240

While in accordance with the patent statutes, the best mode and preferred embodiment have been set forth, the scope of the invention is not limited thereto, but rather by the scope of the attached claims.

What is claimed is:
1. A light curable adhesive system for connecting two or more articles, comprising:

a light curable adhesive composition comprising a light curable silicone-containing compound and a photoinitiator capable of curing the silicone-containing compound, and a primer composition comprising an amine-containing compound in a carrier liquid, wherein the carrier liquid is one or more of methanol, ethanol, isopropanol, hexane, and heptane, the adhesive composition capable of adhering two or more polymer articles after curing, wherein the amine-containing compound comprises at least a tertiary amine, and wherein the amine-containing compound is present in an amount from about 0.05 to about 1 part by weight per 100 parts by weight of the primer composition.

2. The light curable adhesive system according to claim 1, wherein the adhesive composition further includes (meth) acrylate monomers in an amount from about 20 to about 70 parts by weight per 100 parts of the adhesive composition.

3. The light curable adhesive system according to claim 1, wherein the adhesive composition and primer composition are separate and adapted to be applied to an article separately, wherein the primer composition is applied to the article and allowed to dry prior to application of the adhesive composition.

4. The light curable adhesive system according to claim 1, wherein the adhesive composition and primer composition are present in the adhesive system as a blend.

5. The light curable adhesive system according to claim 1, wherein the light curable silicone-containing compound has the general formula:

where A represents a polymer or copolymer backbone, which can be any number of combinations of polyurethane, silicone, polyamide, polyether, and polyester; $R^1$ and $R^2$ may be the same or different and are monovalent hydrocarbyl groups having up to 10 carbon atoms, or halo- or cyano-substituted hydrocarbyl groups; $R^3$ and $R^4$ may be the same or different monovalent groups and may contain an ethylenically unsaturated polymerizable double bond; $R^5$ is a methyl, ethyl, isopropyl or $-CH_2CH_2OCH_3$; a is 0, 1, or 2; a+b is 1 or 2; and $R^6$ is a monovalent hydrocarbyl group or 6. A light curable adhesive system for connecting two or more articles, comprising:

a light curable adhesive composition comprising a light curable silicone-containing compound and a photoinitiator capable of curing the silicone-containing compound, and a primer composition separate from the adhesive composition and comprising an amine-containing compound in a carrier liquid, wherein the primer composition is applied to at least one of the two or more articles separately and allowed to dry prior to application of the adhesive composition, wherein the carrier liquid is one or more of a hydrocarbon solvent and an organic solvent, and wherein the amine-containing compound is an aliphatic amine having one or more of the following formulae:

a) $R-NH_2$, wherein R is one or more carbon atoms, b)

wherein each R, independently, is an alkyl radical from 1 to about 20 carbon atoms optionally substituted with one or more functional groups, c)

wherein each R, independently, is as defined above, d)

wherein each R, independently, is as defined above, wherein $R_1$ is a hydrogen atom or an alkyl radical having from 1 to about 4 carbon atoms, e)

wherein each R and $R_1$ are as defined above and $R_2$ is an alkyl or alkenyl radical containing from 1 to 8 carbon atoms, f)

wherein R and $R_2$ are as defined above and $R_3$ represents a hydrogen atom or an alkyl radical containing from 1 to about 4 carbon atoms, wherein the adhesive composition is capable of adhering the two or more polymer articles after curing, wherein the amine containing compound comprises one or more of a primary, secondary and tertiary amine, and wherein amine-containing compound is present in the carrier liquid in an amount from about 0.01 part to about 2 parts by weight based on 100 total parts by weight of the primer composition.

7. The light curable adhesive system according to claim 6, wherein the amine-containing compound comprises at least a tertiary amine.

8. The light curable adhesive system according to claim 7, and wherein the amine-containing compound is present in an amount from about 0.05 part to about 1 part by weight per 100 parts by weight of the primer composition.

9. The light curable adhesive system according to claim 6, wherein the adhesive composition further includes (meth) acrylate monomers in an amount from about 20 to about 70 parts by weight per 100 parts of the adhesive composition.

10. The light curable adhesive system according to claim 6, wherein the carrier liquid is one or more of naphtha, hydrotreated light naphtha, hexane, heptane, methanol, isopropanol, and ethanol.

11. The light curable adhesive system according to claim 6, wherein the light curable silicone-containing compound has the general formula:

where A represents a polymer or copolymer backbone, which can be any number of combinations of polyurethane, silicone, polyamide, polyether, and polyester; $R^1$ and $R^2$ may be the same or different and are monovalent hydrocarbyl groups having up to 10 carbon atoms, or halo- or cyano-substituted hydrocarbyl groups; $R^3$ and $R^4$ may be the same or different monovalent groups and may contain an ethylenically unsaturated polymerizable double bond; $R^5$ is a methyl, ethyl, isopropyl or —$CH_2CH_2OCH_3$; a is 0, 1, or 2; a+b is 1 or 2; and $R^6$ is a monovalent hydrocarbyl group or 12. A light curable adhesive system for connecting two or more articles, comprising:
a blend comprising:
a light curable silicone-containing compound, wherein the light curable silicone-containing compound has the general formula:

where A represents a polymer or copolymer backbone, which can be any number of combinations of polyurethane, silicone, polyamide, polyether, and polyester; $R^1$ and $R^2$ may be the same or different and are monovalent hydrocarbyl groups having up to 10 carbon atoms, or halo- or cyano-substituted hydrocarbyl groups; $R^3$ and $R^4$ may be the same or different monovalent groups and may contain an ethylenically unsaturated polymerizable double bond; $R^5$ is a methyl, ethyl, isopropyl or —$CH_2CH_2OCH_3$; a is 0, 1, or 2; a+b is 1 or 2; and $R^6$ is a monovalent hydrocarbyl group or a photoinitiator capable of curing the silicone-containing compound;

an amine-containing compound; and a carrier liquid comprising one or more of naphtha, hydrotreated light naphtha, hexane, heptane, methanol, isopropanol, and ethanol, the adhesive composition capable of adhering two or more polymer articles after curing, wherein the blend further includes (meth)acrylate monomers, wherein the amine containing compound comprises one or more of a primary, secondary and tertiary amine, and wherein the carrier liquid is one or more of naphtha, hydrotreated light naphtha, hexane, heptane, methanol, isopropanol, and ethanol.

13. The light curable adhesive system according to claim 12, wherein the amine-containing compound comprises at least a tertiary amine.

14. The light curable adhesive system according to claim 12, wherein the amine-containing compound is an aliphatic amine having one or more of the following formulae:

a) R—$NH_2$, wherein R is one or more carbon atoms, b)

wherein each R, independently, is an alkyl radical from 1 to about 20 carbon atoms optionally substituted with one or more functional groups, c)

wherein each R, independently, is as defined above, d)

wherein each R, independently, is as defined above, wherein $R_1$ is a hydrogen atom or an alkyl radical having from 1 to about 4 carbon atoms, e)

wherein each R and $R_1$ are as defined above and $R_2$ is an alkyl or alkenyl radical containing from 1 to 8 carbon atoms f)

wherein R and $R_2$ are as defined above and $R_3$ represents a hydrogen atom or an alkyl radical containing from 1 to about 4 carbon atoms.

15. The light curable adhesive system according to claim 14, wherein the amine-containing compound is one or more of the amine-containing compounds defined in formulae c), d), e) and f).

* * * * *